(12) United States Patent
Degenkolb et al.

(10) Patent No.: US 7,757,208 B2
(45) Date of Patent: Jul. 13, 2010

(54) FLOORPLAN MANAGER

(75) Inventors: Marko Degenkolb, Wlesloch (DE);
Ioannis Grammatikakis, Maxdorf (DE); Ralf Halbedel, Heidelberg (DE);
Torsten Kamenz, Wiesloch (DE);
Martin Zurmuehl, Muehlhausen (DE)

(73) Assignee: SAP AG, Walldorf (DE)

( * ) Notice: Subject to any disclaimer, the term of this patent is extended or adjusted under 35 U.S.C. 154(b) by 766 days.

(21) Appl. No.: 10/936,775

(22) Filed: Sep. 8, 2004

(65) Prior Publication Data
US 2006/0053381 A1 Mar. 9, 2006

(51) Int. Cl.
G06F 9/44 (2006.01)
(52) U.S. Cl. ...................................... 717/109
(58) Field of Classification Search .......... 717/104–116
See application file for complete search history.

(56) References Cited
U.S. PATENT DOCUMENTS
6,083,276 A * 7/2000 Davidson et al. ............ 717/107
6,208,345 B1 * 3/2001 Sheard et al. ............... 715/853

OTHER PUBLICATIONS

Ross Nelson, "Running Visual Basic™ for Window™", Microsoft Press, Version 2.0, pp. 1-21, 1993.*
Joseph Mayo, "Borland C#Builder for the Microsoft .NET Framework", Borland Software Corporation, pp. 1-18, Aug. 2003.*
Mike Montana (www.ragingchipmunk.com/code/visualdeveloper.htm), "If you havn't Examine the Visual Component Manager with VB6 Enterprise", Aug. 2, 2003, http:///web.archive.org/web/20030802103615, pp. 1-6.*
Sun Microsystems, "Project Rave: Developer Productivity for Java™ Applications", Aug. 2003, White Paper Sun.com/software, pp. 1-39.*

* cited by examiner

*Primary Examiner*—Ted T Vo
(74) *Attorney, Agent, or Firm*—Finnegan, Henderson Farabow, Garrett & Dunner, LLP (57) ABSTRACT

A method of generating a current user interface for an application includes receiving an indication of an event, obtaining a visual component for the current user interface based on the event, and building the current user interface using the visual component. The visual component is a constituent of the current user interface that defines a function of the current user interface.

20 Claims, 5 Drawing Sheets

FLOORPLAN MANAGER

BACKGROUND

1. Technical Field

This patent application relates generally to processing by a digital computer and, more particularly, to generating a user interface for an application program.

2. Background Information

A user interacts with an application program (or, simply, "application") via a user interface (UI). A typical UI contains visual elements, such as buttons, check boxes, and edit controls. These visual elements communicate with each other by raising, and reacting to, user-initiated events. Each application may be responsible for updating its own UI in response to such events.

Different applications, even those produced by the same manufacturer, can have a different "look and feel", e.g., different buttons, navigational tools, controls, layout, and the like. As a result of these differences, and the way in which UIs are updated, related applications may not look related, at least with respect to their UIs. This can cause confusion among users, particularly those who are not computer savvy.

SUMMARY

In one aspect, the invention is directed to method for generating a current user interface for an application. The method includes receiving an indication of an event, obtaining a visual component for the current user interface based on the event, and building the current user interface using the visual component. The visual component comprises a constituent of the current user interface that defines a function of the current user interface. Corresponding computer programs and apparatus are also provided, along with one or more of the following features.

The visual component may be obtained by obtaining an identity of the visual component from a configuration file for the current user interface and retrieving the visual component. Building the current user interface may include instantiating the visual component. The indication of the event may be received from a previous user interface, and the method may include removing, from the current user interface, other visual components that were on the previous user interface but not in the configuration file for the current user interface. The event may include an input to the current user interface.

The input may include at least one of navigation from a previous user interface and an action that affects display of the visual component. The current user interface may be a refreshed version of a previous user interface having the visual component. The method may include generating a roadmap pattern on the current user interface. The roadmap may be generated by passing a parameter to a controller for the application, and receiving a state of the application in response to the parameter. The roadmap pattern may then be generated in accordance with the state of the application.

The method may include generating a context assistance pattern on the current user interface. This pattern may provide instructions relating to the visual component. Generating the context assistance pattern may include passing a parameter to a controller for the application, and receiving a state of the application in response to the parameter. The pattern may be generated in accordance with the state of the application.

In general, in another aspect, the invention is directed to a method of generating a current user interface for an application. The method includes defining visual components for the application, where the visual components comprise objects and data needed to generate the current user interface. The method also includes defining an invisible component for the application, where the invisible component defines a navigation path to the current user interface, and the invisible component has access to a configuration file that identifies the visual components. In response to an event, a layout of the current user interface is obtained from the configuration file via the invisible component, where the layout comprises the visual components. The current user interface is built using the visual components. Corresponding computer programs and apparatus are also provided Other features and advantages described herein will be apparent from the description, the drawings, and the claims.

BRIEF DESCRIPTION OF THE DRAWINGS

Like reference numerals in different figures indicate like elements.

DETAILED DESCRIPTION

The floorplan manager (FPM) is software that controls displays for software applications. The FPM can standardize the "look and feel" of such applications by generating user interfaces that have substantially similar structures and that are navigable in substantially the same way. The FPM is described herein in the context of a self-service application; however, the FPM can be used with any type of application.

The FPM may be a central part of a self-service architecture. A self-service architecture includes an application and associated software that allows a person to perform a task or set of tasks. Examples of applications that have a self-service architecture include an employee self-service (ESS) application and a manager self-service (MSS) application. An ESS application may allow an employee to enter information into a centralized database, e.g., via a Web page. For example, an ESS application may allow the employee to changes a name, address, benefits, and the like via a UI, such as the Web page in FIG. 5. An MSS application is similar to an ESS application, except that an MSS application is limited to use by a manager. An MSS application may allow a manager to effect changes relating to management of employees, their status within an organization, and the like.

User interfaces (UI) for self-service applications include individual screen elements. Examples of these elements include table controls, and tools buttons. The screen elements form "patterns", such as a screen area to change the values of a table entry or a group of buttons to proceed or "step back" in an application. These patterns define common functions and UI elements designed for a specific task or, more often, for a specific group of intended users. This is referred to as application's "floorplan". The FPM can operate to ensure consistency among the floorplans of various applications, or it can simply be used to update the floorplans of applications irrespective of consistency.

In this embodiment, each self-service application is a Web Dynpro application; however, the FPM may be used with other types of applications as well. Web Dynpro's approach to creating UIs enables a user to isolate concerns when building, changing, or extending an application. With Web Dynpro, a developer defines views to allocate screen space and determines what will appear on the end-user's screen by arranging basic UI elements. The views are strung together with navigational links to define a possible sequence of views the user will see. It is also possible to define nested views, or view sets, that divide a screen into smaller areas, each capable of showing one view at a time.

While views determine what an end-user sees on screen, a software controller handles actions that are invoked from the screen, such as clicking a button and selecting data in a table, or passes them on to other controllers so that the other controllers can handle them. The software controllers constitute active entities in the user interface. Any data managed in a Web Dynpro UI is attributed to some controller. The hierarchy of data that a controller "owns" is its context. For data to automatically travel from one controller to the other, it is possible to assign mappings between the contexts of different controllers. For other relationships, one may set bindings to define automatic, bi-directional data flow between some part of a context and some UI elements in a view's layout or some part of a model layer that encapsulates a backend system.

Each self-service application is defined by a starting point, meaning the window of the application that is displayed first. Once a first window of an application is visible, the behavior of the application, e.g., display of subsequent windows, depends on "events" initiated by the user and a system response thereto. As noted above, windows of Web Dynpro components may be comprised of multiple views. A self-service application may include several such views, e.g., one view for each (possible) step of an application floorplan. A self-service application uses assembled views called perspectives. A perspective defines the visual content of an application in a certain state, meaning which visual components are contained on a particular UI. In the context of the FPM, the UI of a self-service application is defined by the perspectives it contains and by possible navigation paths between these perspectives.

Figure 1:
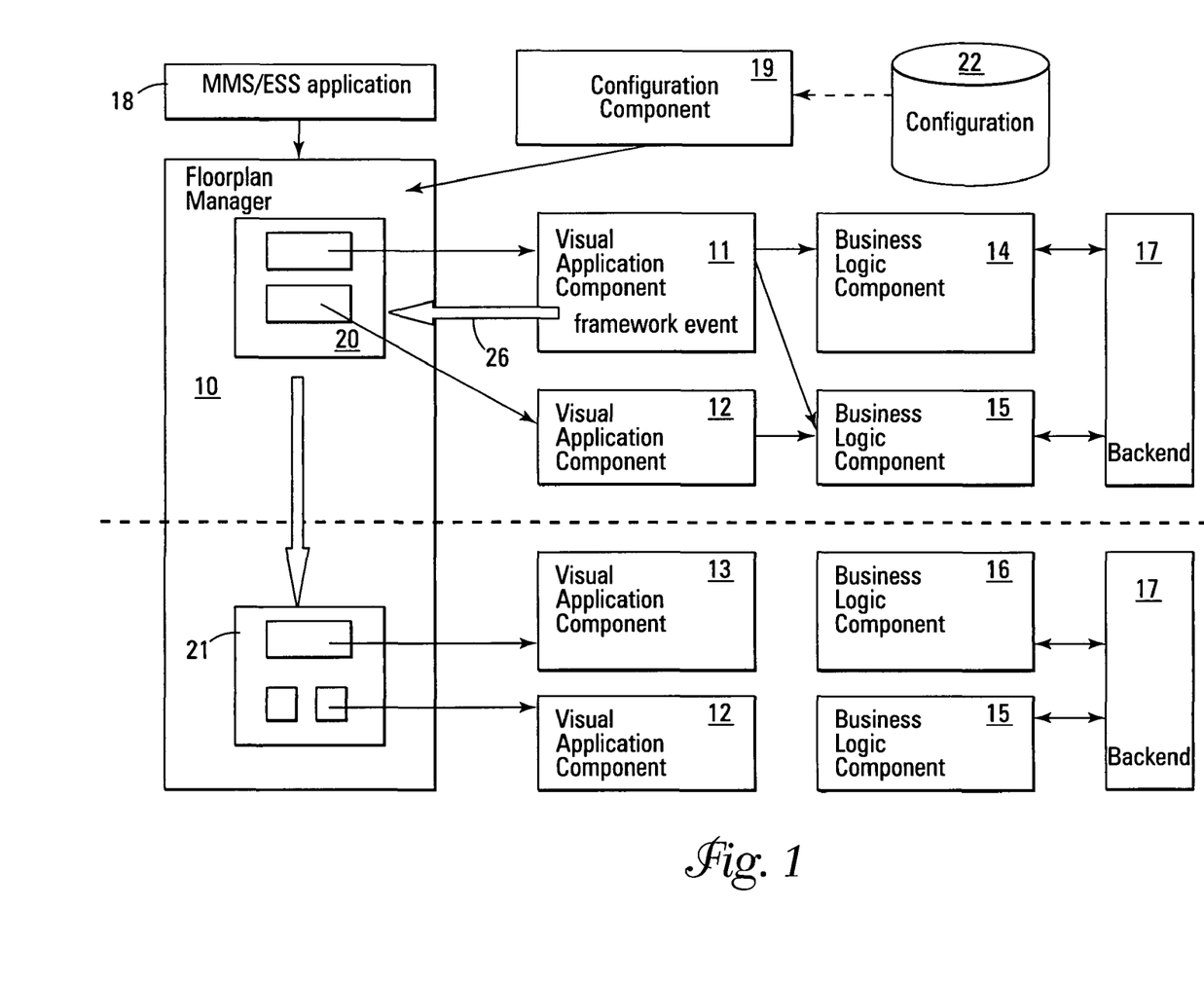
FIG. 1 is a block diagram of the architecture of the floorplan manager in conjunction with a framework (or, "floorplan manager") event.

Referring to FIG. 1, FPM 10 defines the following types of UI components. Visual application components (VACs) 11, 12, 13. VACs are the building blocks of perspectives, and contain all objects, data, and other elements needed to generate a perspective. VACs display data (e.g., text, menus, buttons, navigational tools, etc.), handle user input, and trigger FPM events. (As described below, an FPM event is an event that usually {but not necessarily} results in a transition between two perspectives, which is effected via an FPM-implemented process known as an "event loop".)

In addition to visual components, a self-service application includes at least two non-visual, or "invisible", components: one to define navigation paths between perspectives of the application, and another one to handle business logic of the application. Business logic components (BLCs) 14, 15, 16 are invisible components that handle communication between the application and a backend system 17. The backend system includes one or more computer systems, e.g., servers, that contain data to present via application 18 and data that is input via application 18. BLCs 14, 15, 16 provide updated and/or new data to a VAC from the backend system, and vice versa. BLCs use one or more Web Dynpro models, prepare the system's backend to send data to the system frontend (e.g., a computer system that is running application 18), and cause the system frontend to display the data as (or in) a VAC.

Configuration component(s) (CCs) 19 are one or more components that define perspectives and navigation paths of a self-service application. The FPM obtains the layout of a perspective 20 from the CC and uses this information to build a subsequent perspective 21. The CCs obtain the perspective layouts from a configuration file 22, which may be associated with application 18. The configuration file defines VACs for application 18, the components that make up the VACs, and the navigational relationships between VACs (e.g., which events trigger display of which VACs). To standardize the UIs of different types of applications, CC 19 may store and use the same VACs for different applications, which FPM 10 may use to implement substantially similar (or exactly the same) functionality on applications that would otherwise have entirely different types of UIs. In this way, the FPM can be used to build UIs that are at least partly consistent across different applications.

In this embodiment, VACs, BLCs and CCs are implemented as Web Dynpro components; however, this is not a requirement. It is also noted that the functionality of one or more of the components, e.g., CC 19, may be implemented within the FPM itself. The following software routines are implemented in the FPM.

onInit: This routine is called when a VAC is initialized. This routine enables a VAC to identify and store a current interface to the FPM, and to identify and register one or more BLCs that are to be used by the VAC to access backend system 17.

onCleanup: This routine is called once for each VAC when application 18 shuts down. This routine is used to remove unnecessary data and data locks from the VACs.

onFlush: This routine is called at the beginning of an FPM event loop. The onFlush routine is used to cause the VAC to transfer new or updated data from the VAC to an appropriate BLC if such data has not already been transferred automatically via context mapping. In this regard, if all the fields of a VAC are directly or indirectly mapped to BLC, their values are automatically updated. In this case, the onFlush routine need not be called by the FPM.

onHide: This routine is called in an FPM event loop when a current perspective changes and a VAC is closed. The routine hides (i.e., makes invisible) designated VACs. The VACs being "hidden" should be in a consistent state, as described below, when the onHide routine is called. The routine isConsistent (also described below) is called to ensure consistency among the VACs.

onBeforeOutput: This routine is called in an FPM event loop whenever a new perspective is built. This routine performs visualization-specific operations, such as calculating the value of a screen field that exists locally (as a convenience for the user), but that is not stored in a backend database.

onEvent: This routine is called for every FPM event except for exit events and cancelled selection change events (both defined below). This routine notifies VACs that an event is taking place. If a VAC cannot perform event-specific operations so that the event can be processed correctly, the VAC notifies the onEvent routine, and instructs it to jump to the end of a current FPM event loop (described in detail below). In this case, the next perspective will not be built in response to a framework event. The FPM may issue a warning message to the user at this point.

onEventCompleted: This routine is called for every FPM event that reaches the onEvent routine. This routine notifies the FPM when and if an event has been processed successfully. If one of the visible VACs in a current perspective was not capable of processing the event correctly, the FPM is notified accordingly.

isDirty: This routine is called for instantiated VACs at the beginning of a selection change event loop and at the end of an FPM event loop (or, simply "event loop"). This routine causes VACs to return information about whether the data they contain has already been saved, and may be used in preventing unintentional loss of data. Since this routine is called often, it is preferable not to perform time consuming checks in this routine. One way of avoiding such time consuming checks is to flag a VAC as "dirty" whenever its fields change, and remove the "dirty flag" when a save event has been processed for the VAC.

isConsistent: This routine is called for VACs that are to be hidden at the end of an event loop. This routine causes VACs to return information about whether the data they contain is consistent, meaning that the data for a current perspective can be processed, and viewed in, a subsequent perspective. A typical example is a series of perspectives to collect data for a complex object, in which the object is saved in a last step of an event loop. If no checks for consistency were made in preceding perspectives, saving the data might fail in the last step. The user would then have to go back step-by-step to the perspective that contained the data that was responsible for the inconsistency.

As noted above, an event usually results in a transition between two UI perspectives, such as perspectives 20 and 21 of FIG. 1. In this regard, generally speaking, Web Dynpro applications are event-driven programs. Visual elements of an application, such as buttons, check boxes, and edit controls, communicate with each other by initiating events and reacting to events received through the Web Dynpro framework. Some events only have consequences inside the component that owns the screen element raising the event. Examples of such events include, but are not limited to, scrolling up and down a table of a table control and switching the visibility of some screen elements to avoid screen clutter. These events are defined as local events. They are handled by the Web Dynpro framework, and are not typically handled by the FPM, at least in this embodiment. What this means is that VACs are updated locally, not through the FPM.

Figure 2:
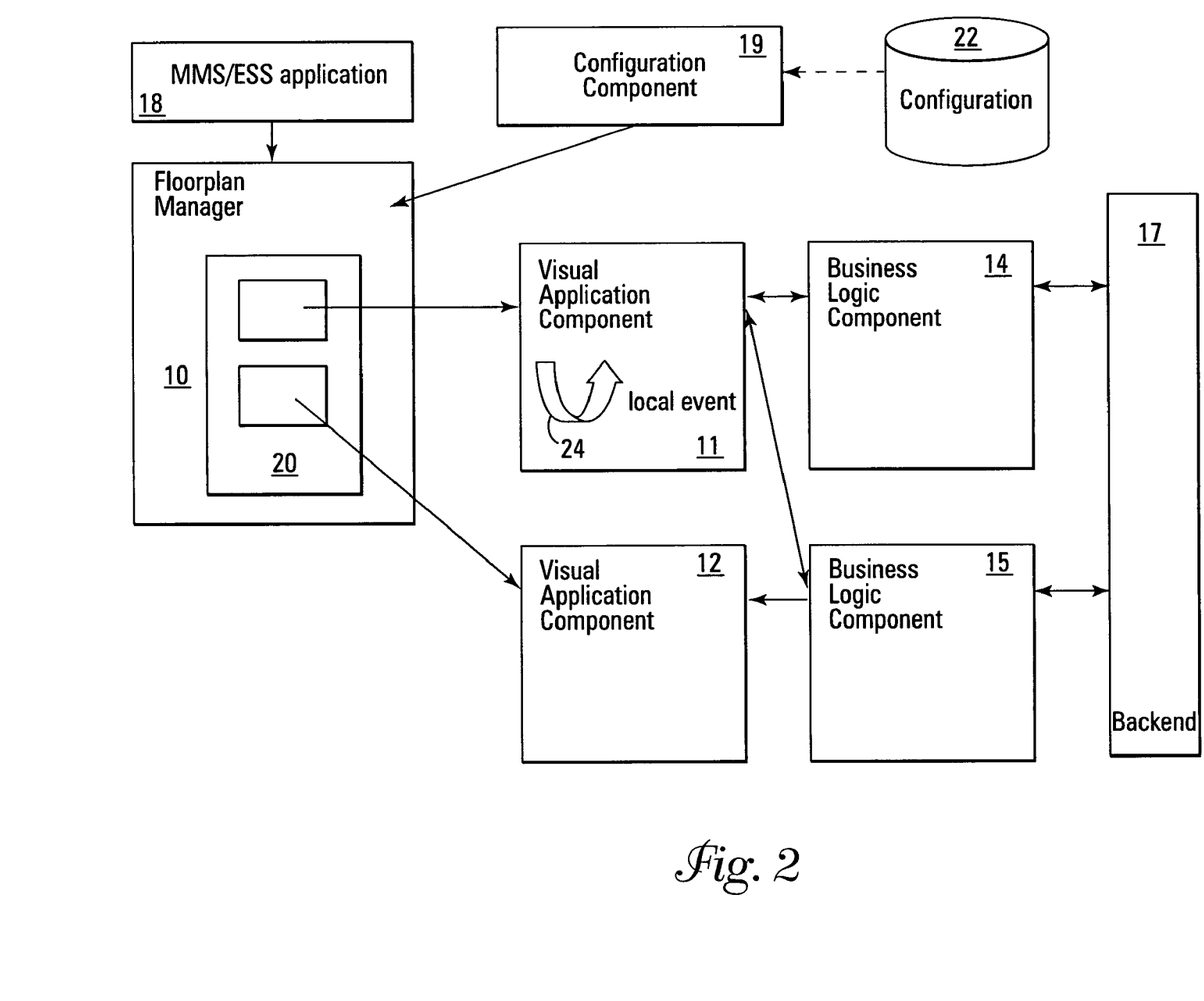
FIG. 2 is a block diagram of an architecture of the floorplan manager in conjunction with a local event.

For example, in FIG. 2, VAC 11 receives a local event 24. VAC 11 does not transmit the event to FPM 10, but rather processes the local even on its own. That is, VAC 11 updates itself without reference to FPM 10. Data displayed in, and input to, VAC 11 may be retrieved from/transmitted to backend system 17 via BLC 14 and/or BLC 15, as shown.

Some events affect components outside the component (e.g., the VAC) that owns the screen element (e.g., button, toolbar, scrollbar, etc.) raising the event. Such events include various types of data selection events where another component (e.g., a BLC) retrieves data from a backend system, navigation events where a perspective changes or is replaced by another perspective, and user events where an action inside a VAC influences graphical elements and/or data can be seen in another VAC. An example of such an event includes changing the main selection in one VAC and updating corresponding details in another VAC. Events such as these are called framework events, or FPM events.

Instead of processing an FPM event itself, a self-service application's VAC notifies the FPM of the event. This triggers an FPM "event loop" and causes the FPM to perform the following tasks (although not necessarily in the following order): (1) notify all VACs of the current perspective and perform checks or actions based on the "type" of the framework event; (2) delete VACs that are no longer required as a result of the event; (3) obtain and initialize new VACs; and (4) build the next perspective or refresh the current perspective using the new VACs. During this operation, the FPM, not the application, is responsible for generating the perspectives (e.g., the UIs) displayed by the application.

Figure 3:
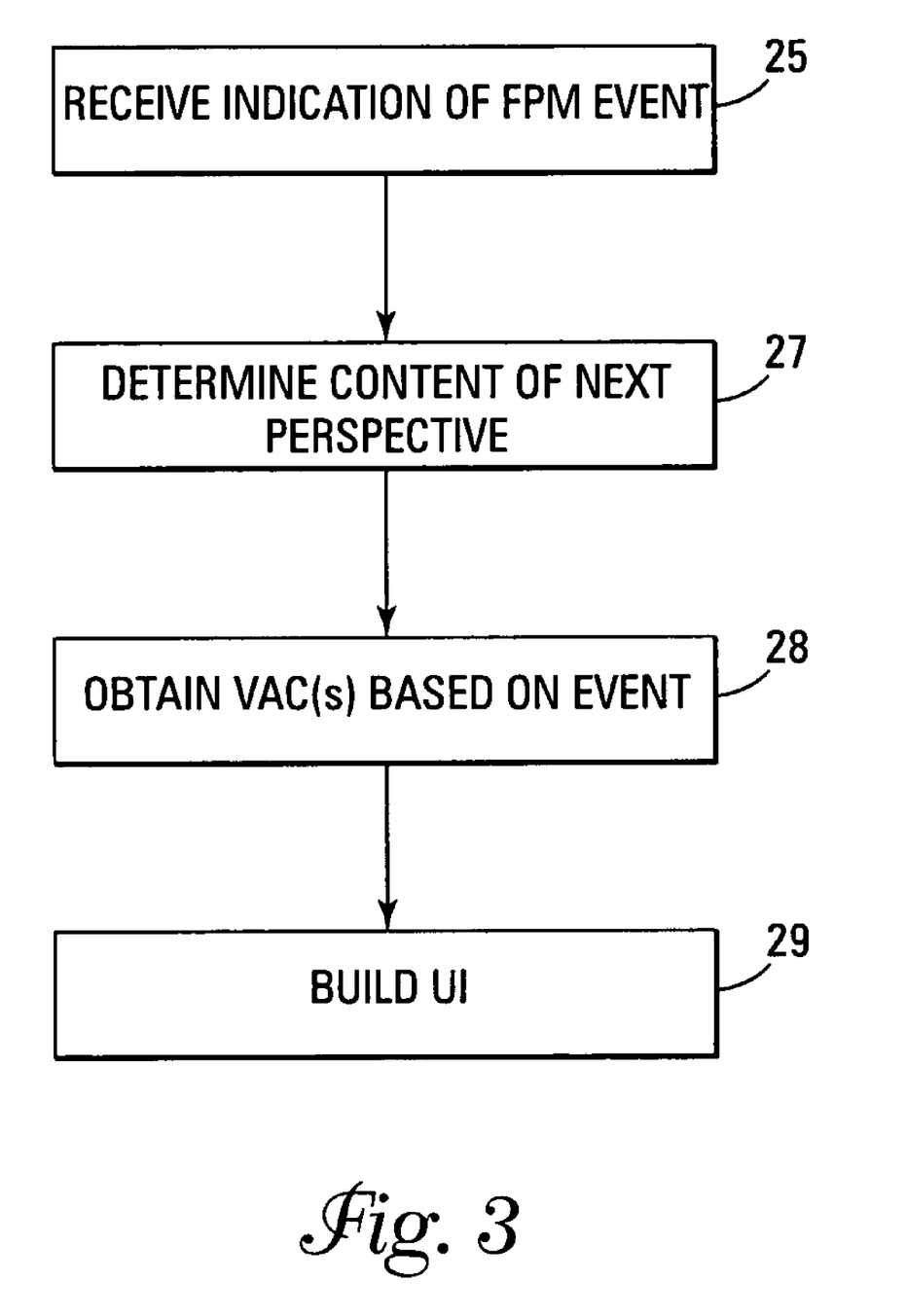
FIG. 3 is a flowchart showing a process for updating a UI via the floorplan manager.
Figure 4:
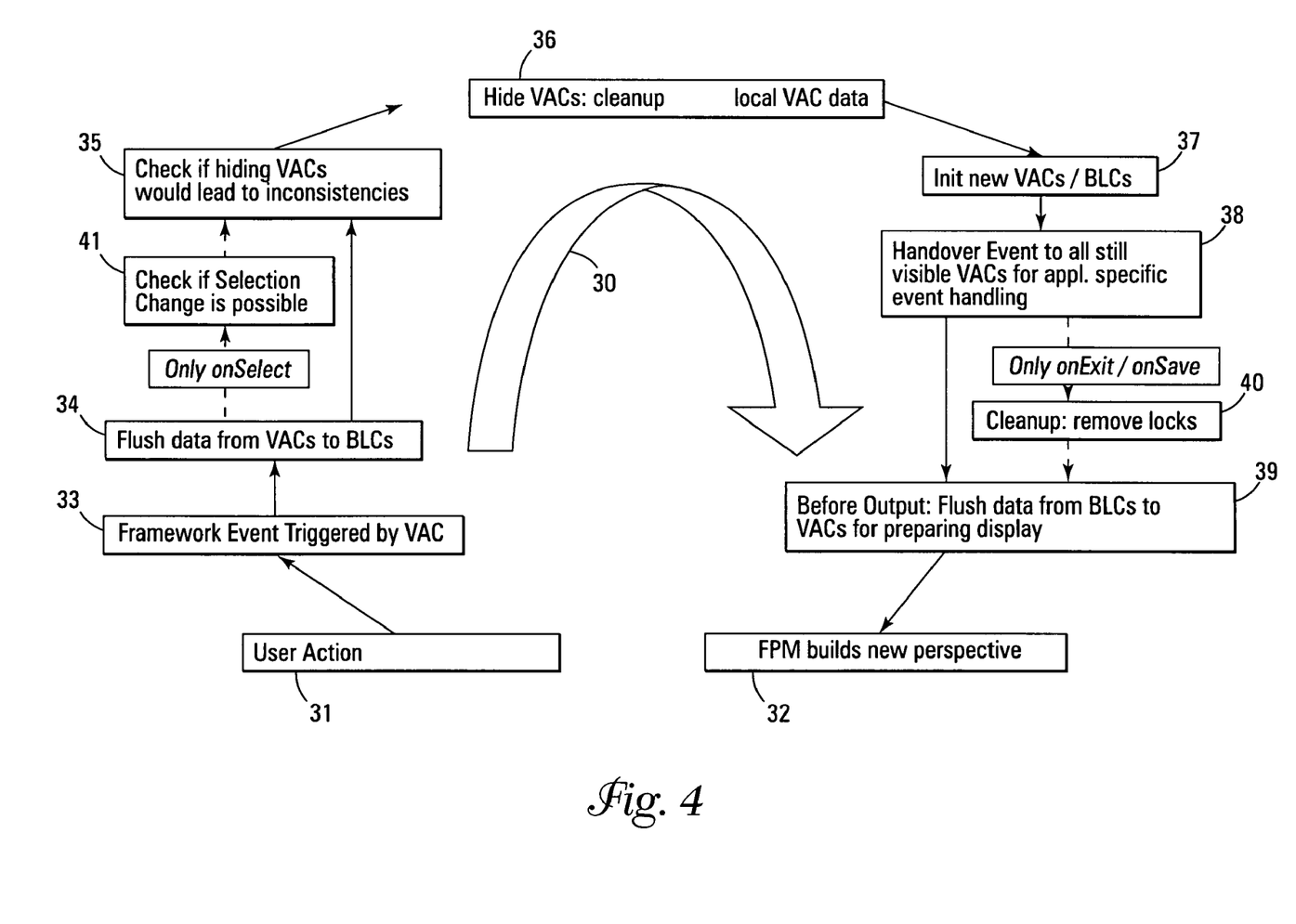
FIG. 4 is a diagram of a floorplan manager event loop, which shows a more detailed process than that of FIG. 3 for updating a UI via the floorplan manager.

Referring to FIGS. 1 and 3, the general process performed by FPM 10 to build a new perspective is as follows. (A more detailed implementation is shown in FIG. 4.) FPM 10 receives (25) an indication 26 of an FPM event from VAC 11. The event may be a navigation event that results in a change from VAC 11 (to, e.g., another VAC or, alternatively, to an update of VAC 11). FPM 10 determines (27), using CC 19, which elements of VAC are to be updated and/or if an additional VAC is to be displayed in a next perspective 21. In this example, a new VAC 13 is to be displayed and VAC 11 is to be removed. As such, FPM 10 obtains (28), from CC 19, the new VAC 13 that corresponds to the event, and builds (29) a new perspective 21 using that VAC. In that new perspective, VAC 11 is replaced by VAC 13 and VAC 12 remains. As shown in FIG. 1, new VAC 13 connects to backend system 17 through BLC 17.

The process of FIG. 3 may be implemented in an FPM event loop 30. FIG. 4 shows an overview of an FPM event loop 30. The event loop shows actions performed by one embodiment of the FPM in response to an event. As shown, the event loop starts in the lower-left corner with a user action 31 and ends in the lower-right corner when a new perspective is built 32. Depending on the "type" of the FPM event, the FPM might skip some of the actions shown in the event loop. Also, some actions in the event loop may be "vetoed" by application 18. These are actions in which a VAC may notify the FPM that the current state of the VAC does not allow the event loop to be performed. For example, if application data from a VAC has been modified and not saved, the FPM may interrupt the event loop and display a warning that the unsaved data might be lost if the event loop were to proceed to its completion without first saving the unsaved data.

Different "types" of framework events lead to the FPM processing the event loop in different ways. A "user" event starts an event loop. The user event can be an application-specific event that is communicated between visible VACs in a current perspective. A user event can include clicking on a button on a UI, navigating to a new UI (e.g., a new Web page), or the like, which can result in a change of perspective.

A "save" event starts an event loop to save all modified or created UI elements. The save event is a special version of a user event, which causes the self-service application to save data. The save event is triggered after the user has modified UI elements (e.g., screen objects) and saves the modified elements.

A "preview" event is a special version of a user event, which allows a user to preview changes before they are saved.

A "selection change" event is an event that is triggered when a UI selection, such as a selected skill in a profile, changes. In response to a selection change event, the FPM checks every VAC to determine if the VAC has unsaved data. If a VAC has unsaved data, the VAC "vetoes" the selection change and the FPM displays a warning message, in response to which the user may discontinue the event loop.

An "exit" event" corresponds to exiting from, or shutting-down, an application. In response to an exit event, the FPM notifies all active components, including VACs and BLCs, that the application is about to shut-down. In turn, the components remove all locks on objects they have accumulated over time. The components also perform any necessary "clean-up" operations (e.g.. deleting unsaved data), and shut down.

Described below are different operations that the FPM performs in response to different types of framework events.

Most of the operations that the FPM performs are performed on an visible VAC. However, this need not always be the case.

The following definitions apply for the description below. Instantiated VACs comprise all VACs that the FPM has ever instantiated since an application was started. Visible VACs comprise all VACs that are currently visible on a UI of the application. Closing VACs comprise VACs that are hidden at the end of a current event loop if the event loop ends with a change of perspective. Opening VACs are VACs that are instantiated during the current event loop and that are visible at the end of the event loop if the event loop ends with a change of perspective.

User Event

Referring to FIG. 4, the FPM starts an event loop in response to a user action 31 that triggers 33 an FPM event in a VAC. In response, the FPM calls the routine onFlush for all currently visible VACs. onFlush gives those VACs the opportunity to transfer 34 (i.e., flush) locally-stored data to a corresponding BLC. The FPM checks the navigation path from the current perspective to a next perspective in order to determine which VACs (closing VACs) will be hidden when the event is processed successfully. This check is made via CC 19 (FIG. 1), which consults configuration file 22. For closing VACs, the FPM calls the routine isConsistent to find out if the closing VACs can be hidden 35. If any of the closing VACs returns false, meaning that they cannot be hidden, the event loop jumps to the end and calls onBeforeOutput and isDirty at all visible VACs. At this point, the FPM may issue a warning to the user. The event loop may then end or proceed depending upon the user's response to the warning. If all closing VACs return the value true, meaning that all closing VACs can all be hidden, the event loop continues by calling the onHide routine for the closing VACs in order to hide 36 those VACs.

The FPM retrieves and initializes 37 opening VACs and BLCs by calling oninit. The identities of new/updated VACs correspond to the user event. Those VACs are retrieved from configuration file 22 by CC 19. The FPM notifies 38 all visible VACs of the event by calling the onevent routine. The VACs will use this information to update or refresh their displays in the next perspective. The visible VACs may initiate a jump to the end of the event loop by returning a value false, meaning that the VACs cannot process the event successfully. This, however, would not happen until all visible VACs have been notified of a result of onEvent by calling onEventCompleted. The FPM then calls the routine onBeforeOutput for all visible VACs to be used in next perspective, which gives each such VAC the opportunity to update (i.e., flush) 39 local data from appropriate BLCs. Thereafter, the FPM builds 32 the new perspective from the visible VACs.

Variations in processing the event loop can result from application vetoes. For example, if a VAC contains "inconsistent" data, the FPM jumps to the end of the event loop.

Save Event

Here, the FPM starts the event loop in response to an event that saves all data on a perspective. The event loop for this type of event is identical to the event loop for user events described above, except that at point 40, the FPM calls the onCleanup routine.

Preview Event

Here, the FPM starts the event loop in response to an event that displays data on a perspective for review prior to saving the data. The event loop for this type of event is identical to the event loop for user events described above.

Selection Change Event

Here, the FPM starts the event loop for an event that changes a leading object of an application. Before processing this type of event, the FPM asks all VACs whether there is unsaved data that would be lost by this change of selection 41. This is done by calling the method isDirty for all instantiated VACs. If one or more of the instantiated VACs return true on isDirty, meaning that the VAC contains unsaved data, it is up to the user to decide whether the event loop will be resumed or halted. If the event loop is resumed, processing continues, otherwise the onBeforeOutput routine is called and the event loop ends.

Exit Event

As the name suggests, this is not strictly an event type. Instead, it is used to stop the application and/or to navigate away from the application. An exit event may include hitting a "cancel" button, re-starting an application, returning to the application's home page, and/or navigating to one or more predefined links. In response to an exit event, the FPM calls the onCleanup routine at point 41 enabling the VACs and BLCs to perform data cleanup before they are closed.

The FPM also includes a Roadmap Pattern (ROP) and a Context Assistance Pattern (CAP). The ROP and the CAP are the "ornaments" of a perspective. Although the FPM is responsible for displaying the ROP and the CAP, the self-service application informs the FPM about the actual contents of the ROP and CAP. In this regard, each perspective usually corresponds to a certain step in the application roadmap. Therefore, the state of the roadmap may change whenever the perspective changes. The CAP might or might not be part of a particular perspective. For example, in a perspective for modifying data, a user might need assistance, in which case the CAP could be displayed.

To determine the current state of the ROP or CAP, the FPM calls the routines getROPState and getCAPState to obtain states from the application's configuration controller (getROPState to obtain a state for the ROP, and getCAPState to obtain a state for the CAP). Both of these routines pass a parameter to the configuration controller and expect a return type of class ROPState (the ROP's state) or CAPState (the CAP's state). An ROP state is defined by an array of ROP steps and information regarding which of these steps is currently active. Each ROP step is defined by a unique identifier (usually "1", "a", "2a" or similar), a text string, and an array of other ROP steps containing the possible sub-steps of this step. The ROP steps can be used to build an ROP, such as ROP 45 of FIG. 5.

Figure 5:
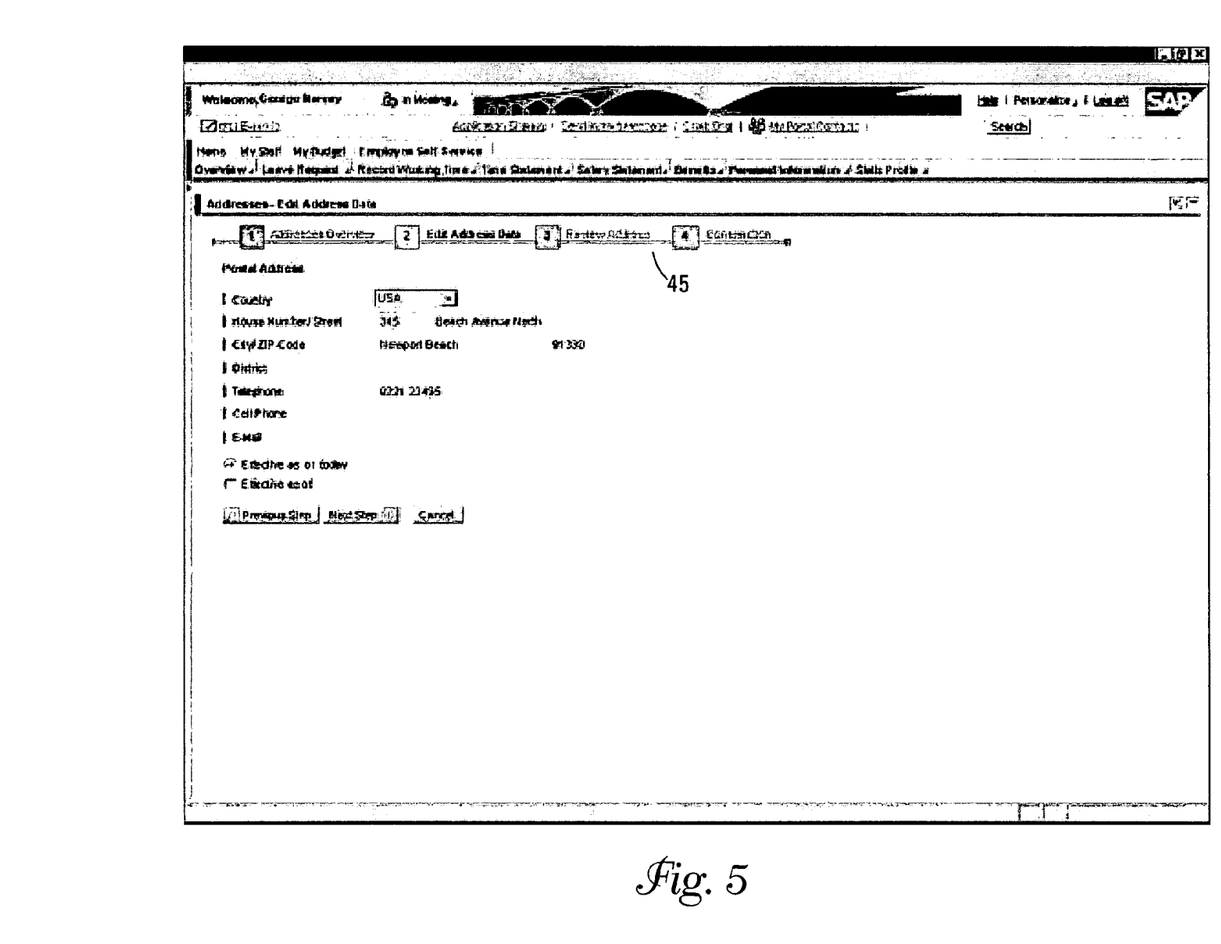
FIG. 5 is an example of a UI that was generated by the floorplan manager, and that contains a roadmap pattern.

A CAP state (not shown) is defined in much the same way as the ROP state. Instead of steps, however, a CAP is comprised of CAP items, which are defined by an identifier, a text string, and the VAC that is displayed when the CAP is activated by the user. A particular CAP state is defined by the list of CAP items (that is, the list of VACs that offer context assistance) and information about which of the CAP items is currently displayed.

Other Embodiments

The floorplan manager is not limited to use with the hardware and software described herein; it may find applicability in any computing or processing environment and with any type of machine that is capable of running machine-readable instructions, such as a computer program.

The floorplan manager can be implemented in digital electronic circuitry, or in computer hardware, firmware, software, or in combinations thereof. The floorplan manager can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the floorplan manager can be performed by one or more programmable processors executing a computer program to perform the functions of the floorplan manager. The method steps can also be performed by, and floorplan manager can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The floorplan manager can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the record extractor, or any combination of such back-end, middleware, or front-end components. The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The floorplan manager not limited to the implementations set forth herein. For example, event loop can be rearranged and/or one or more its actions can be omitted to achieve similar results. As noted above, the floorplan manager may operation outside of a Web Dynpro and self-service architecture context.

Elements of different embodiments may be combined to form another embodiment not specifically set forth above. Other embodiments not specifically described herein are also within the scope of the following claims.

What is claimed is:

1. A method of generating a current user interface of a running application, the method comprising:
   receiving, by a computer system, an indication of an event from an existing visual component of the running application;
   obtaining, by the computer system, a new visual component for the current user interface based on the event, the new visual component comprising a constituent of the current user interface that defines a function of the current user interface;
   obtaining, by the computer system, a business logic component based on the event, the business logic component handling communication between the new visual component and a backend;
   building, by the computer system, the current user interface using the new visual component;
   passing, by the computer system, a parameter to a controller for the running application;
   receiving, by the computer system, from the controller, a state of the running application in response to the parameter, the state defining which visual components are on the current user interface; and
   generating, by the computer system, a roadmap pattern for the current user interface in accordance with the state of the running application, the roadmap pattern comprising layouts of user interface elements for each step of the running application.

2. The method of claim 1, wherein obtaining the new visual component comprises:
   obtaining an identity of the new visual component from a configuration file for the current user interface; and
   retrieving the new visual component; and
   wherein building the current user interface comprises instantiating the new visual component.

3. The method of claim 2, wherein the existing visual component is on a previous user interface; and the method further comprises:
   removing, from the current user interface, other visual components that were on the previous user interface but not in the configuration file for the current user interface.

4. The method of claim 1, wherein the event comprises an input to the current user interface.

5. The method of claim 1, wherein the input comprises at least one of navigation from a previous user interface and an action that affects display of the existing visual component.

6. The method of claim 1, wherein the current user interface comprises a refreshed version of a previous user interface having the existing visual component.

7. The method of claim 1, wherein a perspective corresponds to a certain step in the roadmap pattern.

8. The method of claim 1, further comprising generating a context assistance pattern on the current user interface, the context assistance pattern providing instructions relating to the new visual component.

9. The method of claim 8, wherein the context assistance pattern is generated in accordance with the state of the running application.

10. The method of claim 1, further comprising defining an invisible component for the running application, wherein the invisible component defines a navigation path to the current user interface.

11. A computer-readable storage device storing a program for causing a computer to perform a method for generating a current user interface of a running application, the method comprising:
    receiving an indication of an event from an existing visual component of the running application;
    obtaining a new visual component for the current user interface based on the event, the new visual component comprising a constituent of the current user interface that defines a function of the current user interface;
    obtaining a business logic component based on the event, the business logic component handling communication between the new visual component and a backend;
    building the current user interface using the new visual component;
    passing a parameter to a controller for the running application;
    receiving, from the controller, a state of the running application in response to the parameter, the state defining which visual components are on the current user interface; and
    generating a roadmap pattern for the current user interface in accordance with the state of the running application, the roadmap pattern comprising layouts of user interface elements for each step of the running application.

12. The computer-readable storage device of claim 11, wherein obtaining the new visual component comprises:
    obtaining an identity of the new visual component from a configuration file for the current user interface; and
    retrieving the new visual component; and
    wherein building the current user interface comprises instantiating the new visual component.

13. The computer-readable storage device of claim 12, wherein the existing visual component is on a previous user interface; and the method further comprises:
    removing, from the current user interface, other visual components that were on the previous user interface but not in the configuration file for the current user interface.

14. The computer-readable storage device of claim 11, wherein the event comprises an input to the current user interface.

15. The computer-readable storage device of claim 11, wherein the input comprises at least one of navigation from a previous user interface and an action that affects display of the existing visual component.

16. The computer-readable storage device of claim 11, wherein the current user interface comprises a refreshed version of a previous user interface having the existing visual component.

17. The computer-readable storage device of claim 11, wherein a perspective corresponds to a step in the roadmap pattern.

18. The computer-readable storage device of claim 11, wherein the method further comprises generating a context assistance pattern on the current user interface, the context assistance pattern providing instructions relating to the new visual component.

19. The computer-readable storage device of claim 18, wherein the context assistance pattern is generated in accordance with the state of the running application.

20. A computer-readable storage device storing a program for causing a computer to perform a method for generating a current user interface of a running application, the method comprising:
    defining visual components for the running application, the visual components comprising objects and data needed to generate the current user interface;
    defining an invisible component for the running application, the invisible component defining a navigation path to the current user interface, the invisible component having access to a configuration file that identifies the visual components;
    obtaining, in response to an event, a layout of the current user interface from the configuration file via the invisible component, the layout comprising the visual components;
    building the current user interface using the visual components;
    passing a parameter to a controller for the running application;
    receiving, from the controller, a state of the running application in response to the parameter, the state defining which visual components are on the current user interface; and
    generating a roadmap pattern for the current user interface in accordance with the state of the running application, the roadmap pattern comprising layouts of user interface elements for each step of the running application.

* * * * *